United States Patent [19]

Fichter

[11] 4,054,922

[45] Oct. 18, 1977

[54] APPARATUS FOR FORMING AN ERASABLE RECORD OF THE VALUE OF A MEASURED QUANTITY

[75] Inventor: Manfred Fichter, Konigsfeld, Germany

[73] Assignee: Kienzle Apparate GmbH, Villingen-Schwenningen, Germany

[21] Appl. No.: 676,913

[22] Filed: Apr. 14, 1976

[30] Foreign Application Priority Data

May 9, 1975 Germany .............................. 2520581

[51] Int. Cl.² .................................................. G11B 5/02
[52] U.S. Cl. ..................................................... 360/56
[58] Field of Search ..................... 360/56, 57; 346/74.1

[56] References Cited

U.S. PATENT DOCUMENTS

| 2,511,121 | 6/1950 | Murphy | 360/56 |
| 3,683,382 | 8/1972 | Ballinger | 360/56 |
| 3,810,191 | 5/1974 | Stauffer | 360/56 |
| 3,879,754 | 4/1975 | Ballinger | 360/56 |
| 3,947,879 | 3/1976 | Stauffer | 360/56 |

*Primary Examiner*—Jay P. Lucas

*Attorney, Agent, or Firm*—Michael J. Striker

[57] ABSTRACT

The record carrier is made of a material which can be caused to assume a dark state by passing a magnetic field through the record carrier normal thereto. It can be caused to assume a light state by establishing in the general plane of the record carrier two magnetic fields which are oriented generally perpendicular to each other. The recording apparatus which incorporates the record carrier is provided with means for effecting record carrier transport past an erasing unit and a writing unit. The writing unit forms a recording trace on the record carrier during such transport by generating a radial field lying in the general plane of the record carrier. Because this field is radial it is comprised of field components which are oriented generally perpendicular to each other and which furthermore are oriented at angles to the record carrier transport direction. The erasing unit erases the recording trace formed by the writing unit by establishing a magnetic field which extends transverse to the record carrier transport direction and which is comprised of field lines passing through the record carrier normal thereto.

16 Claims, 10 Drawing Figures

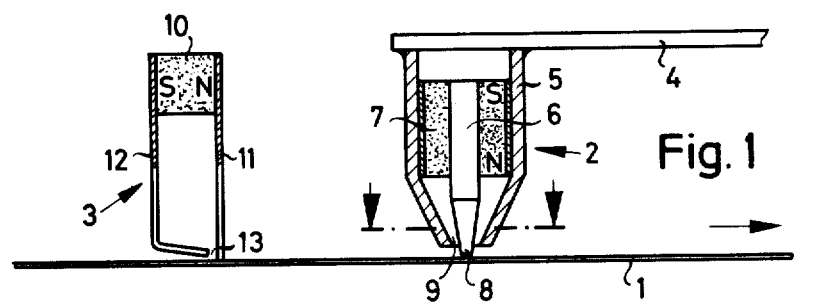
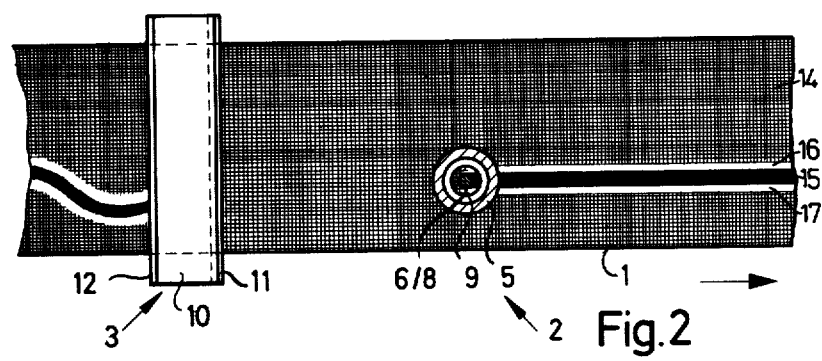
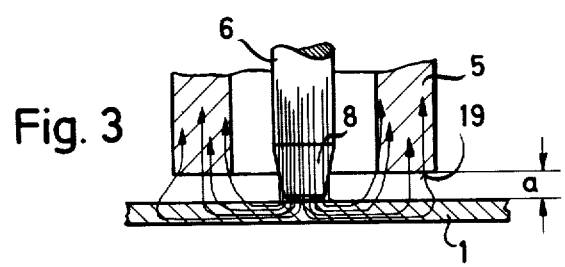
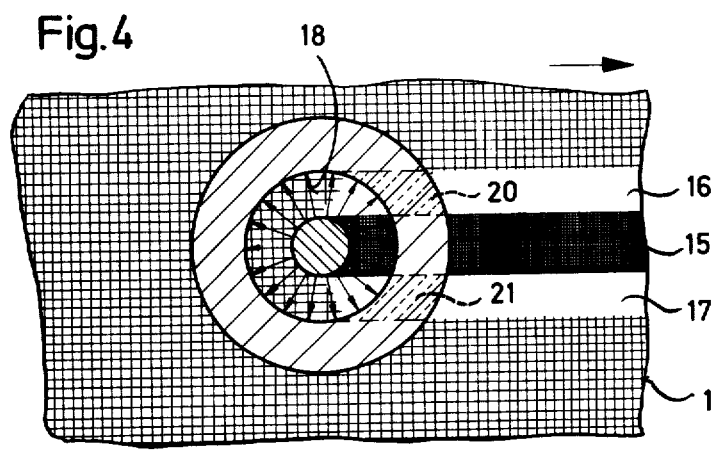

APPARATUS FOR FORMING AN ERASABLE RECORD OF THE VALUE OF A MEASURED QUANTITY

BACKGROUND OF THE INVENTION

The invention relates to an arrangement for erasably and continually recording the value of a measured quantity on a record carrier of the type which can be written upon by means of magnetic fields. The invention is especially concerned with record carriers of the type on which a visible, legible record can be made during relative movement between the writing unit of a recording apparatus, on the one hand, and the record carrier, on the other hand.

In many situations where it is desired to continually record the value of a continually measured quantity, it is not actually desired to keep a record of the entire history of the value of that quantity. Instead, it is many times only of interest to know about the variation in the value of the measured quantity for a limited period of time immediately preceding an event of interest, with the history of the measured quantity prior to such limited period of time being of no interest whatsoever. To this end, it is possible to continually record the measured value and, simultaneously therewith, continually erase that portion of the record corresponding to times which are no longer of interest. However, if in this way a record is continually formed and continually erased, with only a portion of the record corresponding to a time interval of preselected duration being in existence at any given moment, then especially when the time interval is of short duration there can arise serious difficulties as to resolution and legibility of the record.

An example of a situation of the type in question is the recording of vehicle operation data. It is often the case that such records are automatically made for the sole purpose of having reliable evidence of the performance of the vehicle during a relatively short time interval preceding a vehicular accident. For example, it may be important to know the speed of a truck for a one-minute time interval preceding a collision in which the truck is involved, for the purpose of proving the presence or absence of negligence, without there being any interest in the speed record of the truck during the hours preceding such collision. In that case, the speed of the truck is continually measured and recorded, but also continually erased, with only the portion of the speed record corresponding to the most recently travelled minute being in existence at any given moment.

It will be understood that considerable demands are made upon devices designed for the collection of information relating to vehicular accidents, because of the need for unquestionable accuracy, legibility, permanence, unequivocal interpretability, and so forth. The continually formed record must be of satisfactory quality over a wide range of temperature and humidity conditions certain to be encountered during use. Additionally, the record preferably should be directly legible — i.e., without the need for reading transducers or developing processes — so that the record can be easily interpreted using the naked eye. Likewise, the record carrier should be of such a character that a traffic officer arriving at the scene of the accident can readily remove the record carrier from the recording apparatus, so that the record may serve as part of the evidence which he collects. Because the record carrier in such a situation may be handled roughly, it is advantageous that the recorded information thereon be fixedly recorded, hold fast and not be rubbed off during handling nor be detrimentally affected by the frictional forces which can develop when it is rubbed. Furthermore, the record carrier advantageously should be both usable as an original and also easily copied.

These requirements are met by a recently disclosed paper-like recording material whose visual characteristics can be altered by magnetic means. This recording material is essentially comprised of two transparent or translucent cover layers and an intermediate emulsion. The emulsion is comprised of oil-filled microcapsules in which are suspended metallic microplates. The microplates are of magnetic material and reflect light. When the recording material is in blank condition, these magnetic microplates are oriented generally in the plane of the record carrier and reflect the light incident upon the record carrier. As a result, the record carrier appears relatively light in color. If now a permanent-magnet or electromagnet writing element is moved over the surface of the record carrier, not necessarily in actual contact therewith, there develops along the path of movement a visible recording trace. The recording trace is dark in color compared to the surrounding surface of the record carrier, and the microplates of the record carrier along the recording trace are found to have been turned by 90° from their original position so as to be oriented generally normal to the surface of the record carrier. As a result, light incident upon the recording trace will be transmitted and/or absorbed by the intermediate emulsion layer, so that the recording trace will appear dark in color.

For such a record carrier, the function of an appropriate erasing device is to first stir around the magnetic microplates in the record carrier and finally turn them into positions lying in the plane of the record carrier, so that incident light will be reflected and the record carrier appear light in color. Experience has shown that an optimal erasing effect is achieved by using two magnetic fields, preferably two alternating magnetic fields, both operative in the plane of the record carrier. In such case, lines extending in the directions of effectiveness of the magnetic fields are crossed by a line extending in the direction of the requisite relative movement between the record carrier and the erasing device generating the magnetic fields. During this relative movement, the magnetic fields at each portion of the record carrier to be erased are operative in directions generally perpendicular to each other and/or they are operative in alternation.

These required characteristics for the erasing device make necessary the use of relatively expensive erasing apparatuses incorporating in general a plurality of coils, in addition to whatever may be required for the generation of the erasing fields proper. For example, it is very desirable to make use of disk-shaped record carriers because, compared to strip-shaped record carriers, especially long ones, they are much easier to handle. However, disk-shaped record carriers require the use of specially shaped field-generating coils for erasing device, and these specially shaped coils can be produced on a mass-production basis only with difficulty.

SUMMARY OF THE INVENTION

It is a general object of the invention to provide an arrangement for both recording upon and erasing record carriers of the type described above in the way described above, but without incurring the disadvantages which would be involved with the complicated erasing devices mentioned.

It is another object to provide an arrangement of the type in question which does not consume electrical energy during the erasing operation.

It is a further object to provide an arrangement of such a design that it can be very readily manufactured on a mass-production basis.

These objects, and others which will become more understandable from the description, below, of preferred embodiments, can be met, according to one advantageous concept of the invention, by using for the writing unit a magnetic device which generates a radial magnetic field lying in the general plane of the record carrier, and by associating with the writing unit a magnetic erasing unit operative for generating a magnetic field which is oriented transverse to the direction of movement of the record carrier and passes through the latter generally normal thereto.

In one embodiment of the invention, the writing unit incorporates a magnetic circuit comprised of a permanent magnet, a cup-shaped flux return structure, a ferromagnetic writing element arranged concentric to the return structure, and an annular air gap between the end of the writing element and the circular edge of the return structure.

According to another concept of the invention, the permanent magnet is arranged between two pole plates lying in parallel planes. One pole plate has an aperture. The other pole plate carries a writing implement. The writing implement extends through and beyond the aperture of the other pole plate, with an annular air gap being left intermediate the outer periphery of the writing implement and the rim of the aperture.

The invention works in a way constituting the opposite of conventional recording methods. With conventional recording methods, a dark recording trace is made upon a light record carrier. In contrast thereto, according to the present invention the record carrier is considered to be in erased condition when it appears dark in color, i.e., when the magnetic microplates are oriented generally normal to the plane of the record carrier. According to the invention, as in conventional recording methods, a dark line constitutes the recording trace; however, to create greater contrast relative to the surrounding blank portions of the record carrier (which according to the invention are likewise dark in color) the dark recording trace is bordered on either side by stripes of light color.

When such an approach is employed, it is of great advantage that the light-dark-light recording trace be capable of being formed in a simple way by the permanent-magnet arrangement disclosed herein, and that to erase the light-dark-light recording trace only a single permanent magnet need be used, the latter extending in direction transverse to the record carrier, with its magnetic field passing through the record carrier generally normal thereto. With this arrangement of the writing and erasing means, neither form coils of complicated shape nor supplemental electrical energy for the erasing is necessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 schematically depicts an embodiment of the invention;

FIG. 2 is a top view looking down upon the embodiment of FIG. 1, at the level indicated by the section line in FIG. 1;

FIG. 3 is an axial section through the writing unit of the apparatus, showing the direction of flow of the magnetic recording flux;

FIG. 4 is a transverse sectional view, on a larger scale, showing the orientation of the magnetic recording field generated by the writing unit;

DESCRIPTION OF THE PREFERRED EMBODIMENTS

Figure 5:
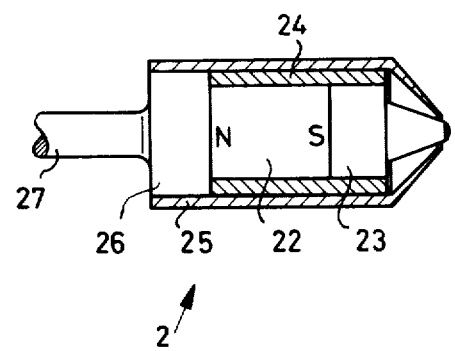
FIG. 5 depicts another version of the writing unit.

In the schematic representation of FIG. 1, numeral 1 denotes a strip-shaped record carrier. Associated with the record carrier 1 are a writing unit 2 and an erasing unit 3. Writing unit 2 may for example be mounted on a lever 4 which swings in proportion to the value of the measured quantity. Writing unit 2 incorporates a permanent-magnet magnetic circuit essentially comprised of a cup-shaped flux return body 5, a writing element 6 arranged concentric thereto, and a hollow cylindrical permanent magnet 7 mounted of the writing element 6. During the making of a recording trace on the record carrier, the end 8 of the writing element 6 can actually lie and slide upon the record carrier, but alternatively it can be moved along the record carrier with a small spacing from the surface thereof. The downwardly converging, conical lower portion of the cup-shaped flux return body 5, together with the writing element 6, forms an annular air gap 9 constituting the working gap for the magnetic flux used to form the recording trace.

The erasing unit 13 is comprised of one or more permanent magnets 10 arranged one next to the other. Cooperating with the permanent magnets 10 are pole shoes 11 and 12. The latter form directly above the record carrier a narrow air gap 13 which, as can be seen in FIG. 2, extends over the full width of the record carrier 1.

With this arrangement of writing and erasing units, if the record carrier 1 moves in the direction of the arrow, there will be formed, upon a portion of the surface 14 of record carrier 1 which is of a uniform dark color after being erased, a recording trace. The recording trace is comprised of a central stripe 15 which likewise is of a uniform dark color, bordered by two stripes 16, 17 of lighter color.

The formation of this light-dark-light recording trace will be explained with reference to FIGS. 3 and 4. As these two Figures show, the magnetic flux within writing element 6 is concentrated by the converging end 8 thereof and emanates from end 8 as a radially oriented field 18. The radially oriented field 18 acts upon the record carrier 1. The flux density of the field is the greatest at the end 8 of the writing implement 6. In addition, the leakage of magnetic flux at the writing implement end 8 is relatively small due to the low magnetic resistance of the record carrier 1; accordingly, in the region of the writing element 8 the orienting effect upon the magnetic microplates within the material of record carrier 1 can be selected as strong as desired by correspondingly selecting the field intensity of the permanent magnet 7, in order that the dark central stripe 15 of recording trace 15, 16, 17 exhibit a contrast relative to the erased (and therefore dark) part of the surface 14 of record carrier 1.

On the other hand, the radial field 18, which spreads out in direction toward the annular surface 19 of the return body 5, has a relatively low density. Furthermore, due to the air gap a between the annular surface 19 and the record carrier 1, there is a relatively high leakage or straying of the magnetic flux. Accordingly, due to the too low field strength and the non-homogeneous character of the field, the normally oriented field emanating from the annular surface 19 exerts an orienting action upon the magnetic microplates in the record carrier 1 which is negligible for practical purposes.

In contrast, in the plane of the record carrier 1, the radial field 18, even if it has a relatively low density, exerts an orienting action upon the magnetic microplates. This is due to the following. When there is relative movement between the record carrier 1 and the radial field 18, the line or relative movement will continually cut through a plurality of component field lines of the radial field each having a different respective direction. Accordingly, for the reasons discussed earlier, optimal conditions exist for causing the magnetic microplates to assume an orientation such that they lie in the general plane of the record carrier. In this way, there are produced bright stripes 16, 17 bordering the dark stripe 15 of the recording trace. As already explained, the orienting action of the field component at regions 20 and 21 (FIG. 4) of return body 5 does not suffice to turn the magnetic microplates out of the orientations which the radial field 18 has just caused them to assume, so that this orienting action does not cause the contrast-boosting stripes 16, 17 to become erased.

It will be understood that the transport speed of the record carrier 1 and the deflection speed of for example the swinging arm 4 of the writing unit, which moves transverse to the record carrier transport direction, must be properly matched to take into account expected extremes of acceleration and deceleration, so that the action of the radial field 18 upon the recording trace will remain neglible.

Due to the shape of the bent over pole shoe 12, and due to the presence of the unnumbered air gap between pole shoe 12 and record carrier 1, the magnetic field at air gap 13 or erasing unit 3 is so oriented that it is effective in the direction of movement of record carrier 1 to first of all induce a turning of the magnetic microplates into positions lying in the general plane of the record carrier 1. When a portion of the record carrier 1 affected in that way by the field at air gap 13 moves a further distance to pole shoe 11, then such portion advantageously comes into actual contact with the pole shoe 11. At this location, the magnetic field of erasing unit 3 is uniformly oriented perpendicular to the record carrier. As a result, the magnetic microplates are turned into positions oriented normal to the plane of the record carrier and surface 14 of the record carrier assumes a solid dark color.

With this erasing unit, even recording traces which are dark compared to the dark color associated with the erased condition of the record carrier surface can be erased so completely, without any residual trace, as to become completely undetectable to the eye.

It is possible to so select the strength of the recording field that there is no difference in darkness (no contrast) between the central stripe 15 of the recording trace, on the one hand, and the surrounding blank area of the surface 14 of the record carrier 1, on the other hand. In that event, the central recording trace stripe 15 would stand out from the surrounding blank area of surface 14 exclusively by virtue of the presence of the two bright bordering stripes 16, 17. However, this elimination of the contrast between central stripe 15 and the surrounding blank area of surface 14 would not result in any further structural simplification of the already very simply constructed erasing unit.

FIG. 5 depicts a differently constructed writing unit 2 incorporating a solid (not hollow) cylindrical permanent magnet 22. Permanent magnet 22 and the writing element 23 are secured in a sleeve 24 which, in turn, is force fitted into the flux return body 25. Sleeve 24 has a high magnetic resistance compared to that of return body 25. The magnetic connection between the permanent magnet 22 and the flux return body 25 is effected by means of a disk 26. Disk 26 is likewise force fitted into the return body 25 and is formed at one axial end with an integral shaft 27. Shaft 27 serves in a way yet to be described to provide axially resilient mounting of the writing unit.

Figure 6:
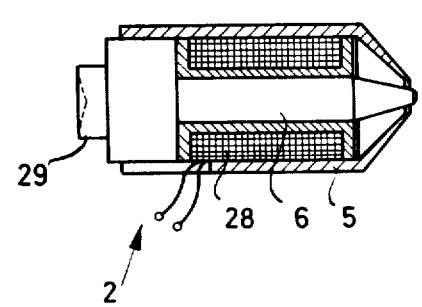
FIG. 6 depicts a writing unit which incorporates an electromagnetic magnetic circuit.

Another construction for writing unit 2 is shown in FIG. 6. The hollow cylindrical magnet 7 of FIG. 1 is here replaced by a coil 28 mounted on the writing element 6. A rivet attachment 29 formed integral on the writing element 6 serves to secure the writing unit 2 in place on a (non-illustrated) lever, which in turn can be stationary or mounted for swinging deflections dependent upon the value of the quantity being measured. Because the magnetic field generated by this writing unit 2 can be turned on and off, the recording trace need not be a solid line. Instead it can be a broken or dotted line, or a combination of broken and dotted line segments. The different kinds of line segments can be utilized to represent additional information, such as the fact that the brakes were applied or the vehicle blinker in operation during a certain time interval. Instead of the writing element 6 being circular at its end, it could be spatula-shaped, in which case it would be possible to form short line segments extending transverse to the transport direction of the record carrier, if the writing unit is mounted stationary.

As a further possibility, instead of mounting the writing unit on a lever, or the like, deflectable in dependence upon the value of the measured quantity, it would be possible to arrange a plurality of stationary writing units side by side in a row extending transverse to the transport direction of the record carrier. In that event, deflection of a lever, or the like, would be unnecessary; instead, it would be possible to energize different ones of the row of writing units in dependence upon the value of the measured quantity, thereby producing a point-type graph instead of a solid-line trace.

Figure 7:
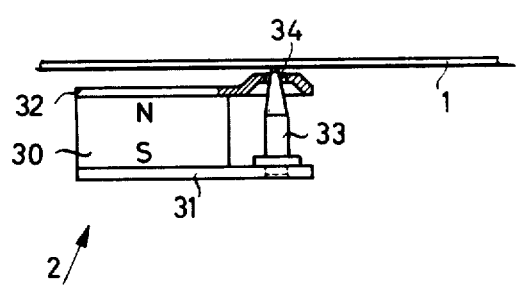
FIG. 7 depicts a writing unit which incorporates a permanent-magnet magnetic circuit.
Figure 8:
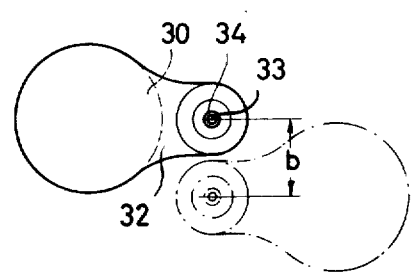
FIG. 8 is a top view of the writing unit of FIG. 7.

FIG. 7 depicts another construction for the writing unit 2. In FIG. 7 a permanent magnet 30 is arranged intermediate two pole plates 31, 32. A writing element 33 is secured on one pole plate 31 in such a way that it projects with its pointed end through an aperture 34 of the other pole plate 32. This construction is characterized by considerably greater flux leakage or straying than are the constructions of FIGS. 5 or 6, because in the latter a more nearly closed magnetic circuit is formed. However, the design of FIG. 7, as shown in FIG. 8, permits for side-by-side arrangement of a plurality of writing units 2 with a relatively small spacing $b$ (3–4mm) between the pointed ends 34 of the writing elements of adjoining writing units 2, despite the relatively large size of the permanent magnets 30 of these units. Additionally, the construction of FIG. 7 has the advantage that it can be assembled from inexpensively produced stamped components. The one or more additional writing units can serve either the purpose mentioned above or can serve for the recording of additional information.

Figure 9:
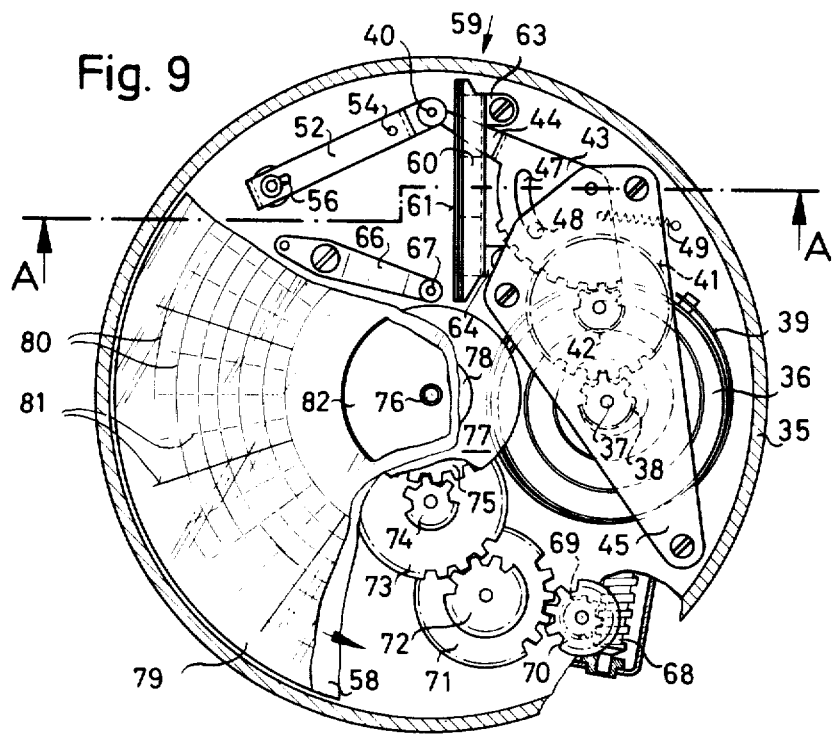
FIG. 9 is a top view of a recording device incorporating novel writing and erasing means according to the invention.

FIG. 9 depicts writing and erasing units such as have been described above in position in an actual recording apparatus, here by way of example a device for recording vehicle operation data preceding a vehicular accident. In per se known manner the recording apparatus for the generating of the signal indicative of the quantity being measured, here the vehicle travel speed, is driven in dependence upon the distance travelled by the vehicle. To this end, use can be made of a flexible shaft arranged intermediate the speed-measuring mechanism, for example an eddy-current tachometer, on the one hand, and, on the other hand, a suitable output of the vehicle transmission, such as would be tapped for driving a dashboard tachometer; this is not shown in FIG. 9, for the sake of simplicity.

In FIG. 9, the housing 35 of the recording apparatus is shown partly broken away. The parts of the eddy-current tachometer visible in FIG. 9 include an eddy-current bell member 36, a gear 38 mounted along with member 36 on a shaft 37 of the measuring mechanism, and a spiral spring 39 having one end stationarily secured and its other end connected to the shaft 37 of the measuring mechanism through a suitable connecting element. In per se known manner, spiral spring 39 applies resisting torque to the (non-illustrated) rotating permanent magnet inside the eddy-current bell number 36. The rotating permanent magnet is connected in suitable manner with the flexible drive shaft referred to above.

For the purpose of transmitting the measured speed value to the writing unit 40, gear 38 is an engagement with an intermediate gear set 41/42. The gear 42 of the latter, in turn, meshes with a gear segment 43 formed with an integral arm 44. The shaft 37 of the measuring mechanism, the intermediate gear set 41/42, and the gear segment 43 are each suitably mounted on a mounting plate 45. Mounting plate 45 in turn is connected to housing 35 by means of small post members 46, of which only one is shown. A slit 47 provided in the gear segment 43 cooperates with a stationarily mounted pin 48 which projects into slit 47, to form together a limiting stop for the angular movement of the arm 44. A tension spring 49 likewise in engagement with gear segment 43 serves to compensate for play or backlash in the gear train intermediate the gear 38 on measuring mechanism shaft 37, on the one hand, and gear segment 43, on the other hand.

The writing unit 40, which here by way of example corresponds to the construction depicted in FIG. 5, includes a shaft 50, by means of which writing unit 40 is held axially shiftable between the two legs 51, 52 of a U-shaped bent mounting bracket 53. Mounting bracket 53 is reinforced by means of a pin 54 which connects together the two legs 51, 52. Mounting bracket 53 is mounted on a mounting pin 55 for pivotal movement. In addition, U-shaped mounting bracekt 53 is shiftably mounted on mounting pin 55, by virtue of the provision of guide slots in the two legs 51, 52 of the U-shaped mounting bracket; in FIGS. 9 and 10 only one such slot can be seen, the guide slot 56 in leg 52 in FIG. 9. Additionally, writing unit 40 is subjected to the action of a weak compression spring 57. Spring 57 serves to compensate for any tolerance play between its mounting in the mounting bracket 53 and the disk-shaped record carrier 58, upon which the writing unit 40 lightly bears.

The transverse deflection of the writing unit 40 is performed under the control of the lever 44, which engages shaft 50 of writing unit 40. The recording errors which are attributable to the arc-like path of motion of the writing unit can be completely compensated for, in per se known manner, using an elliptical-to-linear motion converter or esle a suitably designed slot-guide linkage. However, in actual practice, recording errors of this kind, in a context such as the one used here for purposes of illustration, can be ignored.

As shown in FIG. 9, the erasing unit 59, comprised of the pole shoes 60, 61 and a permanent magnet 62, extends over the entire radial registration range of the record carrier 58. As indicated in FIG. 9 by the arrow, record carrier 58 turns in counterclockwise direction, so that each sector of the record carrier 58 passes the erasing unit 59 just before reaching the working region of the writing unit 40. One pole shoe 60 of erasing unit 59 is screwed at its tongues 63, 64 onto the housing 35. A cut-out 65 in the pole shoe 60 permits the arm 44 to extend through pole shoe 60.

Numeral 66 denotes an additional writing arm stationarily mounted in suitable manner on the housing 35; it can for example be designed as a leaf spring. Writing arm 66 carries at its free end a writing unit 67, here corresponding to the construction shown in FIG. 6; i.e., the writing unit 67 is electrically controllable. The additional writing unit 67, or a further non-illustrated writing unit, could be arranged for operation at the outer edge portion of the record carrier 58.

In the illustrated embodiment, not only the eddy-current tachometer, but also the record carrier 58 is driven in dependence upon the distance travelled by the vehicle; this has been done both for the sake of simplicity, and also because in the illustrated embodiment the recording apparatus used for explanatory purposes is one intended for recording vehicle operation information only for the time period just preceding a traffic accident. Specifically, the driving force for the record carrier 58 is taken off the (non-illustrated) mounting shaft for the (non-illustrated) rotary magnet of the eddy-current tachometer; the rotary magnet and the mounting shaft therefor are coupled to the flexible shaft described above. The driving force taken off the mounting shaft of the tachometer magnet is transmitted to a gear 75, through the intermediary of a worm wheel 69 meshing with a worm screw 68 and intermediate gears 70, 71, 72, 73 and 74. Gear 75 is mounted on shaft 76, which latter is centrally mounted with reference to the housing 35. Fixedly connected with the shaft 76 is a support 77. Gear 75 could for example be designed as a ring gear on the support 77. Support 77 is provided with a projection 78. Projection 78 serves to effect the centering of the record carrier 58 on a rotating disk 79. Disk 79 supports the record carrier 58 and rotates with it and furthermore serves as a counter-pressure member for the writing unit 40. Rotating disk 79 is advantageously transparent and, to facilitate reading of the values recorded on the record carrier, is advantageously provided with concentric lines 80 and radial lines 81 respectively serving to establish the vehicle-speed and distance-travelled scales. The record carrier 58 and the rotating disk 79 are fixedly secured to the support 77 by means of a knurled holding nut 76 which can be screwed onto an external thread provided on the shaft 76.

Figure 10:
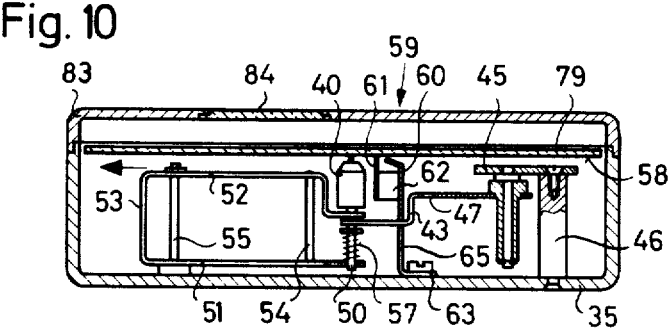
FIG. 10 is a sectional view taken along line A-A of FIG. 9.

Housing 35 is closed off at its front side by means of a cover 83. Cover 83 can be made of transparent material to facilitate inspection of the record carrier. However, in some circumstances it is appropriate to take measures to prevent tampering with the record carrier. Such tampering could be effected, for example, by moving a strong permanent magnet across the record carrier from outside the housing in order to erase the recording trace on the record carrier within the housing. To eliminate that possibility, both the housing 35 and its cover 83 can be made of material of low magnetic resistance, so as to create in effect a magnetic shield completely enclosing the record carrier 58. If in the latter case it is necessary to see whether a recording trace is being made, then the cover 83 can be provided with a sector-shaped viewing window 84, as shown in FIG. 10, so positioned as to permit viewing of both the writing and erasing units.

In the illustrated exemplary embodiment, involving an apparatus for recording pre-accident information concerning vehicle operation, it is furthermore advantageous to make the cover 83 readily removable from the housing 35, for example by using a screw connection or bayonet connection, in order to permit a traffic officer arriving at the scene of the accident to gain quick access to the information on the record carrier; however, to preserve the integrity and evidentiary value of the recorded information, the joint between the cover 83 and housing 35 can be bridged by an easily broken lead seal.

It will be understood that each of the elements described above, or two or more together, may also find a useful application in other types of constructions differing from the types described above.

While the invention has been illustrated and described as embodied in the context of a recording apparatus operative for recording vehicle operation data for a short time interval preceding a traffic accident, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a recording apparatus operative for making and erasing records of the values of a measured quantity on a transported record carrier of the type having characteristics alterable by means of magnetic fields, particularly a record carrier made of a material which can be caused to assume a first state of lower brightness and reflectivity by passing a magnetic field through the record carrier normal thereto and which can be caused to assume a visually distinguishable second state of higher brightness and reflectivity by establishing in the general plane of the record carrier two magnetic fields which are oriented generally perpendicular to each other, in combination, a writing unit operative for forming a recording trace on the record carrier during record carrier transport, the writing unit comprising first means operative for generating a radial writing field lying in the general plane of the record carrier, the writing field because it is radial being comprised of field components which are oriented generally perpendicular to each other and which furthermore are oriented at angles to the record carrier transport direction, to thereby cause the record-carrier material to assume its second state of higher brightness and reflectivity; and an erasing unit for erasing the recording traces formed by the writing unit, the erasing unit comprising second means operative for establishing a magnetic erasing field which extends transverse to the record carrier transport direction and which is comprised of erasing field lines passing through the record carrier normal thereto to thereby cause the record-carrier material to assume its first state of lower brightness and reflectivity.

2. In an apparatus as defined in claim 1, the writing unit being comprised of a mounting shaft, and the recording apparatus further including a bracket mounting the shaft for longitudinal shifting movement of the writing unit and spring means for biasing the longitudinally shiftable writing unit in direction towards the record carrier.

3. In an apparatus as defined in claim 1, the first means comprising means for generating a radial writing field lying in the general plane of the record carrier and comprised of radial writing-field field lines extending in the plane of the record carrier for a limited predetermined distance in the vicinity of the writing unit, whereby to produce a well-defined recording trace whose dimensions correspond to the limited predetermined distance.

4. In an apparatus as defined in claim 3, the second means comprising magnetic means operative for producing an erasing field which upon relative movement between the erasing unit and record carrier passes through the record-carrier material in the general plane of the latter within a narrow first zone extending transverse to the direction of relative movement and then emerges from the record-carrier material normal thereto within a narrow second zone extending transverse to the direction of relative movement, the second zone being downstream of the first zone considered in the direction of relative movement between the erasing unit and the record carrier, whereby within the first narrow zone the record-carrier material is prepared for erasure and within the second narrow zone the material is actually erased by causing it to assume its state of lower brightness and reflectivity.

5. In an apparatus as defined in claim 1, the first means comprising a writing element, a flux-return structure surrounding the writing element, and magnetic means operative for producing a magnetic writing field which emanates from the writing element and into the record-carrier material normal to the latter, then passes through the record-carrier material in the general plane of the latter in direction radially away from the writing element, and then leaves the record-carrier material normal thereto and enters into the flux-return structure surrounding the writing element, whereby upon relative movement between the writing unit and the record-carrier material the field lines emanating from the writing element cause the part of the material penetrated normally by those field lines emanating from the writing element to assume a state of lower brightness and reflectivity, whereas the radial field lines cause the parts of the material penetrated by the radial field lines and adjoining to either side the part penetrated by the normal field lines from the writing element to assume a state of higher brightness and reflectivity, the part of the material of lower brightness and reflectivity in conjunction with the parts of higher brightness and reflectivity adjoining the latter to either side thereof together constituting a light-dark-light recording trace.

6. In an apparatus as defined in claim 5, the second means comprising magnetic means operative for producing an erasing field which upon relative movement between the erasing unit and record carrier passes through the record-carrier material in the general plane of the latter within a narrow first zone extending transverse to the direction of relative movement and then emerges from the record-carrier material normal thereto within a narrow second zone extending transverse to the direction of relative movement, the second zone being downstream of the first zone considered in the direction of relative movement between the erasing unit and the record carrier, whereby within the first narrow zone the record-carrier material is prepared for erasure and within the second narrow zone the material is actually erased by causing it to assume its state of lower brightness and reflectivity.

7. In an apparatus as defined in claim 1, the second mass comprising magnetic means operative for producing an erasing field which upon relative movement between the erasing unit and record carrier passes through the record-carrier material in the general plane of the latter within a narrow first zone extending transverse to the direction of relative movement and then emerges from the record-carrier material normal thereto within a narrow second zone extending transverse to the direction of relative movement, the second zone being downstream of the first zone considered in the direction of relative movement between the erasing unit and the record carrier, whereby within the first narrow zone the record-carrier material is prepared for erasure and within the second narrow zone the material is actually erased by causing it to assume its state of lower brightness and reflectivity.

8. In an apparatus as defined in claim 1, the second means forming a magnetic circuit and being comprised of at least one permanent magnet, a pair of pole plates associated with the opposite poles of the permanent magnet and extending in direction transverse to the record carrier transport direction over the full registration width of the record carrier, the free ends of the pole plates together forming a narrow air gap located adjacent the record carrier, with the free end of one pole plate being spaced from the record carrier and that of the other pole plate being in contact with the record carrier.

9. In a recording apparatus operative for making and erasing records of the values of a measured quantity on a transported record carrier of the type having characteristics alterable by means of magnetic fields, particularly a record carrier made of a material which can be caused to assume a first state by passing a magnetic field through the record carrier normal thereto and which can be caused to assume a visually distinguishable second state by establishing in the general plane of the record carrier two magnetic fields which are oriented generally perpendicular to each other, in combination, a writing unit operative for forming a recording trace on the record carrier during record carrier transport, the writing unit comprising first means operative for generating a radial field lying in the general plane of the record carrier, the field because it is radial being comprised of field components which are oriented generally perpendicular to each other and which furthermore are oriented at angles to the record carrier transport direction; and an erasing unit for erasing the recording traces formed by the writing unit, the erasing unit comprising second means for operative for establishing a magnetic field which extends transverse to the record carrier transport direction and which is comprised of field lines passing through the record carrier normal thereto, the first means forming a magnetic circuit and being comprised of a permanent magnet, a cup-shaped flux return body having an annular end, and a ferromagnetic writing element arranged concentric to the return body, the end of the writing element and the annular end of the cup-shaped return body together defining an annular air gap.

10. In an apparatus as defined in claim 9, wherein the cup-shaped flux return body converges conically towards the end of the writing element.

11. In an apparatus as defined in claim 9, wherein the end of the writing element extends in direction toward the record carrier beyond the annular end of the cup-shaped flux return body.

12. In an apparatus as defined in claim 9, wherein the permanent magnet is a hollow cylindrical magnet arranged coaxial to the writing element.

13. In an apparatus as defined in claim 9, wherein the permanent magnet is a solid cylindrical magnet, the first means further including a holding sleeve made of magnetically non-conductive material and secured within the cup-shaped return body, both the solid cylindrical magnet and the writing element being located within and held in position by the holding sleeve.

14. In a recording apparatus operative for making and erasing records of the values of a measured quantity on a transported record carrier of the type having characteristics alterable by means of magnetic fields, particularly a record carrier made of a material which can be caused to assume a first state by passing a magnetic field through the record carrier normal thereto and which can be caused to assume a visually distinguishable second state by establishing in the general plane of the record carrier two magnetic fields which are oriented generally perpendicular to each other, in combination, a writing unit operative for forming a recording trace on the record carrier during record carrier transport, the writing unit comprising first means operative for generating a radial field lying in the general plane of the record carrier, the field because it is radial being comprised of field components which are oriented generally perpendicular to each other and which furthermore are oriented at angles to the record carrier transport direction and an erasing unit for erasing the recording traces formed by the writing unit, the erasing unit comprising second means operative for establishing a magnetic field which extends transverse to the record carrier transport direction and which is comprised of field lines passing through the record carrier normal thereto, the first means forming a magnetic circuit and being comprised of an electrically controllable magnet, a cup-shaped flux return body having an annular end, and a ferromagnetic writing element arranged concentric to the return body, the end of the writing element and the annular end of the cup-shaped return body together defining an annular air gap.

15. In an apparatus as defined in claim 14, the electrically controllable magnet being comprised of a coil mounted on the writing element.

16. In a recording apparatus operative for making and erasing records of the values of a measured quantity on a transported record carrier of the type having characteristics alterable by means of magnetic fields, particularly a record carrier made of a material which can be caused to assume a first state by passing a magnetic field through the record carrier normal thereto and which can be caused to assume a visually distinguishable second state by establishing in the general plane of the record carrier two magnetic fields which are oriented generally perpendicular to each other, in combination, a writing unit operative for forming a recording trace on the record carrier during record carrier transport, the writing unit comprising first means operative for generating a radial field lying in the general plane of the record carrier, the field because it is radial being comprised of field components which are oriented generally perpendicular to each other and which furthermore are oriented at angles to the record carrier transport direction; and an erasing unit for erasing the recording traces formed by the writing unit, the erasing unit comprising second means operative for establishing a magnetic field which extends transverse to the record carrier transport direction and which is comprised of field lines passing through the record carrier normal thereto, the first means forming a magnetic circuit and being comprised of two pole plates located in parallel planes, a permanent magnet intermediate the pole plates, and a ferromagnetic writing element mounted on one pole plate, the other pole plate having an aperture, and the writing element extending from the one pole plate through the aperture in the other pole plate and toward the record carrier, the outer periphery of the writing element and the rim of the aperture together forming an annular air gap.

* * * * *